US007783387B2

(12) United States Patent
Calcagno

(10) Patent No.: US 7,783,387 B2
(45) Date of Patent: Aug. 24, 2010

(54) PROCESS FOR CONTROLLING INDUSTRIAL ROBOTS, AND RELATED ROBOTS, SYSTEMS AND COMPUTER PROGRAMS

(75) Inventor: Renzo Calcagno, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 1097 days.

(21) Appl. No.: 11/404,706

(22) Filed: Apr. 14, 2006

(65) Prior Publication Data
US 2006/0271209 A1 Nov. 30, 2006

(30) Foreign Application Priority Data
Apr. 19, 2005 (EP) .................................. 05425247

(51) Int. Cl.
*G05B 15/00* (2006.01)
(52) U.S. Cl. .......................... 700/264; 700/11; 700/17; 700/19; 700/20; 700/21; 700/83; 700/245; 700/12; 318/567; 318/568.11; 318/568.12
(58) Field of Classification Search ........................ None
See application file for complete search history.

(56) References Cited

U.S. PATENT DOCUMENTS

| | | | | |
|---|---|---|---|---|
| 6,167,464 | A * | 12/2000 | Kretschmann | 710/15 |
| 6,282,460 | B2 * | 8/2001 | Gilliland et al. | 700/255 |
| 6,330,493 | B1 * | 12/2001 | Takahashi et al. | 700/245 |
| 6,362,813 | B1 * | 3/2002 | Worn et al. | 345/169 |
| 6,560,513 | B2 | 5/2003 | Krause et al. | |
| 6,697,681 | B1 * | 2/2004 | Stoddard et al. | 700/17 |
| 6,717,382 | B2 * | 4/2004 | Graiger et al. | 318/587 |
| 7,151,848 | B1 * | 12/2006 | Watanabe et al. | 382/141 |
| 7,208,900 | B2 * | 4/2007 | Carlson et al. | 318/568.11 |
| 7,228,202 | B2 * | 6/2007 | Carlson et al. | 700/245 |
| 7,451,016 | B2 * | 11/2008 | Johannessen et al. | 700/245 |
| 7,525,274 | B2 * | 4/2009 | Kazi et al. | 318/568.1 |
| 7,577,497 | B2 * | 8/2009 | Johannessen et al. | 700/245 |
| 2005/0141681 | A1 * | 6/2005 | Graiger | 379/90.01 |
| 2006/0108960 | A1 * | 5/2006 | Tanaka et al. | 318/568.21 |
| 2006/0122730 | A1 * | 6/2006 | Niemela et al. | 700/245 |

FOREIGN PATENT DOCUMENTS

| | | | |
|---|---|---|---|
| WO | WO 02/078913 | A1 | 10/2002 |
| WO | WO 02/078914 | A1 | 10/2002 |
| WO | WO 02/078915 | A1 | 10/2002 |

OTHER PUBLICATIONS

European Search Report for Application No. 05425247.3.

* cited by examiner

*Primary Examiner*—Thomas G Black
*Assistant Examiner*—Sze-Hon Kong
(74) *Attorney, Agent, or Firm*—Young Basile

(57) ABSTRACT

A robot system (X-Z) includes a plurality of manipulators (1x-2x, 1y-2y, 1w-2w, 1z-2z) and a portable terminal (3), said terminal being able to connect to the manipulators in wireless mode. The system is conceived so as to enable the terminal (3) to connect to a first manipulator (1x-2x) in a programming mode (Main) and, during the same session, to connect to a second manipulator (1w, 2w) in a monitoring mode (Secondary).

24 Claims, 7 Drawing Sheets

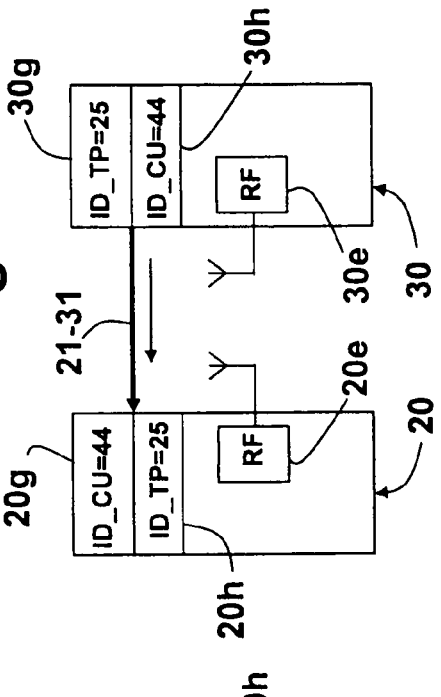
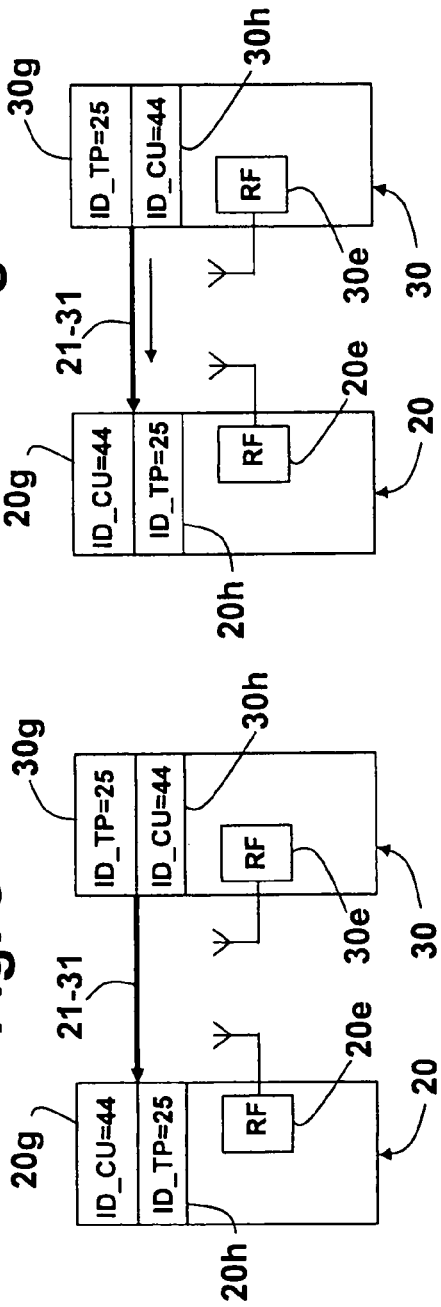
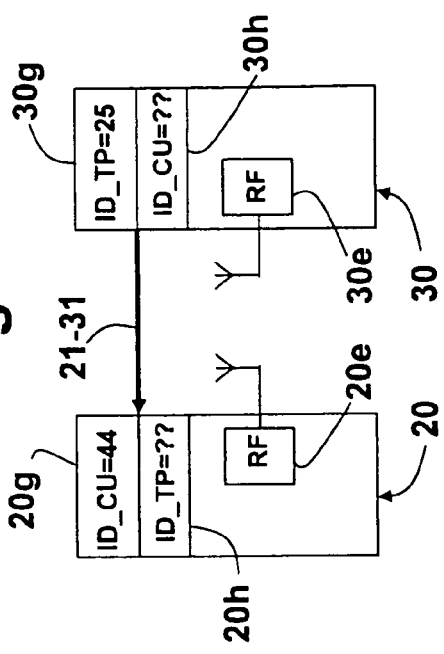
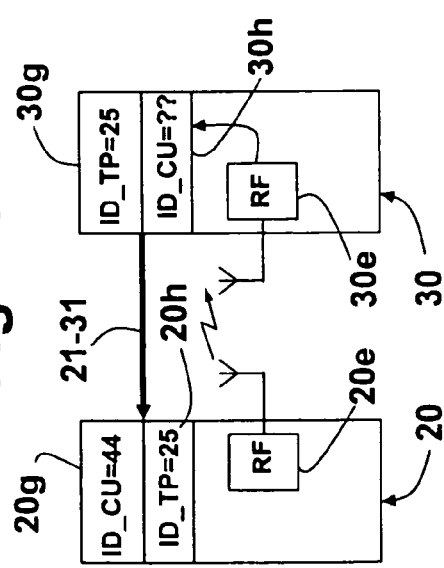

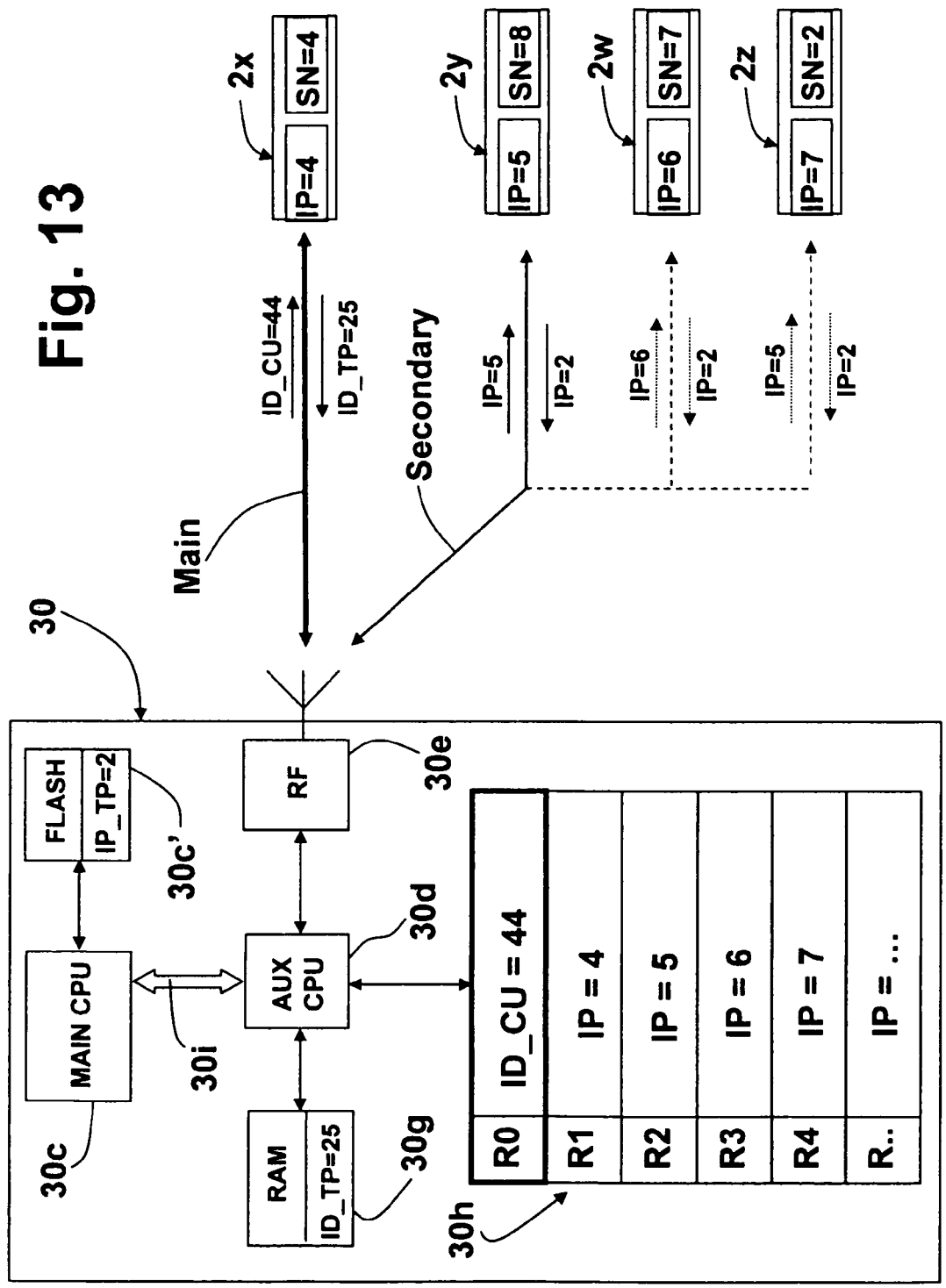

PROCESS FOR CONTROLLING INDUSTRIAL ROBOTS, AND RELATED ROBOTS, SYSTEMS AND COMPUTER PROGRAMS

BACKGROUND OF THE INVENTION

The present invention relates to industrial robots and was conceived in particular for the possible application of robots with a portable terminal associated therewith and designed to communicate in wireless mode with the robot control unit.

"Wireless" refers here to a communication involving a wireless communication of signals by means of electromagnetic waves, preferably by radio-frequency but possibly also by means of ultrasounds or infrared radiations or radiations in another frequency field.

Programming a robot basically means teaching said robot the trajectory which a point of its manipulator should repeat automatically during normal operating steps in order to execute a given operation. A robot can thus operate at least in an automatic and in a manual mode, which can usually be selected on the robot control unit. When manual mode is selected, for instance for programming or "teaching" a robot, the respective manipulator can be handled through instructions sent by a portable terminal; conversely, when automatic operation mode is selected, the motion of the manipulator is subject only to the control unit.

Most of the programming time is for manually controlling the robot, so as to identify the optimal points of the motion trajectories of the manipulator and store the coordinates thereof. To this purpose the aforesaid portable programming terminal is used, also known as teach pendant, which is operatively connected to the robot control unit and typically comprises a display and a series of pushbuttons used for programming and manually controlling the robot. The teach pendant can also be used for monitoring the robot program, for checking machine statuses, for modifying certain program parameters and so on.

In some solutions the terminal is connected to the control unit by means of a cable having such a length as to enable the operator to move near the working area of the manipulator and accurately check related points and trajectories. The aforesaid cable enables a limited controllability for the operator in his/her programming activity, since s/he should move continuously near the manipulator; another drawback consists in that the cable can get caught or entangled with other cables and should thus be freed. Moreover, the cable is subject to wear and tear and damages and therefore needs to be repaired or replaced. In order to solve such drawbacks it has been suggested to operatively connect the portable terminal to the control unit in wireless mode.

The operating environment in which a robot performs its functions, known as "cell", has different configurations depending on the system layout and can contain one manipulator or more manipulators operating coordinately, each manipulator being equipped with its control unit. The use of wireless data exchange technology has a further advantage consisting in that one teach pendant can be used for controlling in manual mode each of the robots of a cell independently so as to program the latter. However, when one of the robots of a cell has to be placed under the manual control of a wireless teach pendant, it is extremely important to establish a definite univocal connection between the teach pendant and the robot to be controlled, so as to avoid possible dangers for the programming operator.

WO 02/078913 describes a system comprising a plurality of robots and a terminal that can communicate with a given robot of said plurality; to this purpose, the control unit of each robot is equipped with a stop pushbutton configured as a removable module, and the terminal is designed to receive said module in a suitable seat. The module comprises memory means containing a code identifying the related control unit; on the other side, the terminal comprises means for reading from said memory means of the module the code identifying the control unit. Knowing said code, the terminal can communicate only with the unit from which the module has been taken, so as to control manually the related manipulator.

The solution mentioned above complicates to a certain extent the implementation of the portable terminal, which should be equipped with a suitable seat and with related means of physical interconnection for the removable module; removable modules are further subject to frequent handlings, which might engender confusions as well as damages and a rapid wear and tear of their contacts, with subsequent risks of bad working.

SUMMARY OF THE INVENTION

In the light of the above, the present invention aims at implementing an industrial robot as previously referred to, which enables an easy and versatile activity involving programming and manual control by means of a portable terminal, however under fully safe conditions. The invention further aims at implementing a robot as previously referred to, ensuring an improved level of safety as far as programming activity is concerned, and whose manufacture is simple, cheap and reliable.

These and other aims, which will be clear in the following, are achieved according to the invention by a process, an industrial robot, a robot system and a computer product having the features listed in the appended claims, which are an integral and substantial part of the description of the present patent application.

BRIEF DESCRIPTION OF THE DRAWINGS

Further aims, characteristics and advantages of the invention will be evident from the following description and from the accompanying drawings, given as mere illustrative and non-limiting example, in which:

FIGS. 8-11 are schematic representations of the steps of a logic decoupling procedure between the control unit and the terminal of FIG. 3;

FIG. 13 is a simplified block diagram disclosing a possible use of a terminal used in the robot system of FIG. 12.

DETAILED DESCRIPTION OF THE INVENTION

Figure 1:
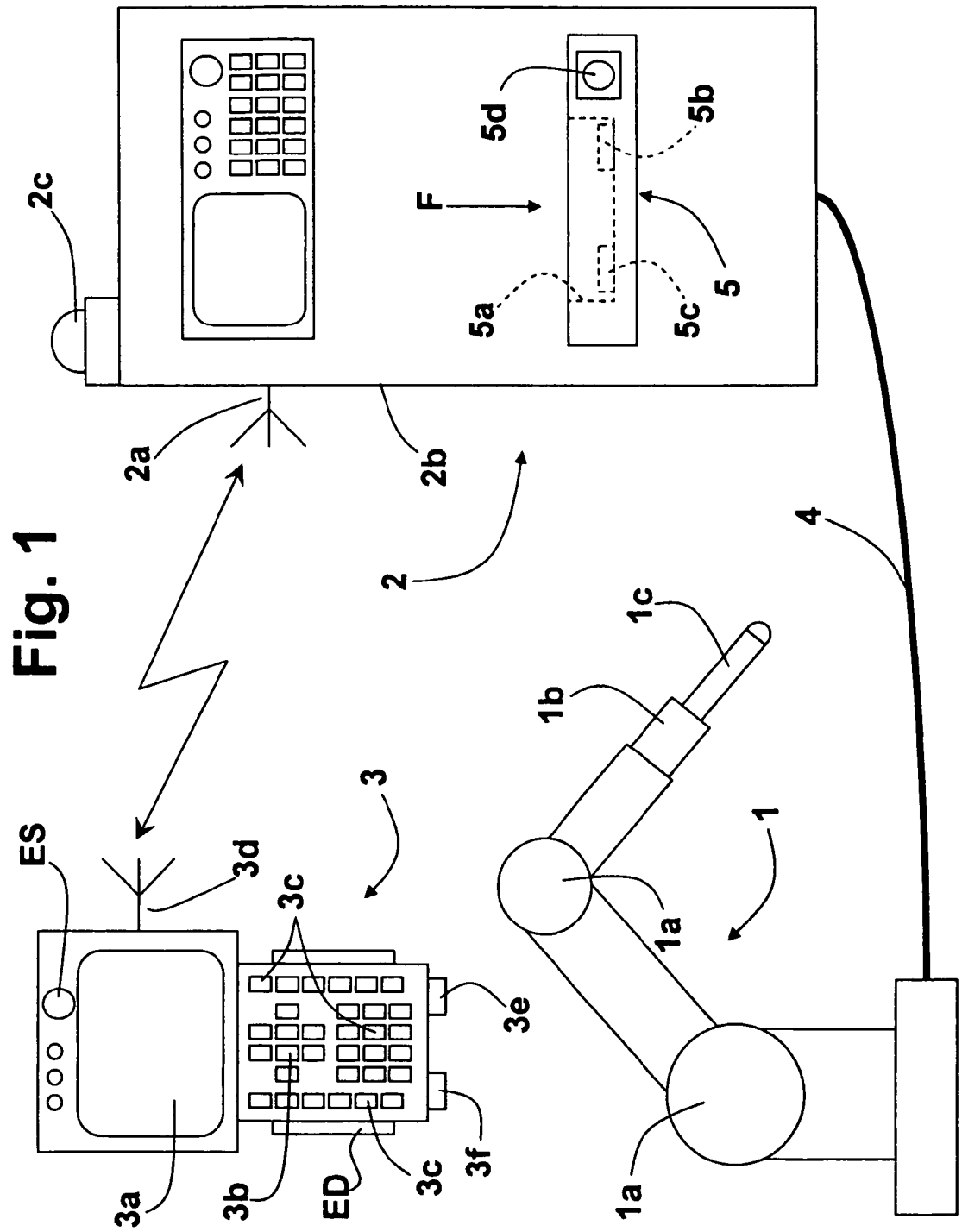
FIG. 1 schematically shows a robot as described here, comprising a manipulator, a control unit of the manipulator and a portable programming terminal.

FIG. 1 shows an industrial robot comprising a manipulator 1, a control unit 2 and a portable programming terminal or teach pendant 3. The manipulator 1 has a plurality of parts moving according to respective axes, articulated by means of joints 1a, and an end wrist 1b carrying a generic tool 1c. The manipulator 1 is connected by means of a cable 4 to its control unit 2. The terminal 3 comprises at least a display 3a, by means of which machine statuses, programming steps, possible alarms and various parameters, such as the position of the axes of the manipulator, can be monitored; the display 3a is used both when programming the positions of the axes and the steps of a movement program and as remote monitor for the unit 2;

a group of keys for controlling the motion of the axes of the manipulator 1, some of which are referred to with 3b; the keys of said groups comprise in particular those for selecting the desired motion reference system and those for controlling motion, known as "jog" keys;

a group of programming and editing keys, some of which are schematically referred to with 3c, used for surfing inside programs shown on the display 3a, for activating various functions and for inputting data.

The terminal 3 further comprises an emergency stop device, referred to with ES, which can consist of a mushroom pushbutton, placed in fixed position on the front panel of said terminal; pressing said pushbutton enables to immediately stop/deactivate the motion of the manipulator 1 and/or of the whole operating cell in which the robot operates. The teach pendant is also equipped with an enabling device, referred to with ED, which should be used together with the keys of the group 3c during the teaching steps or the steps of manual control of the motion of the manipulator 1; in practice, the enabling device ED should be kept active by the operator, so as to enable the manipulator 1 to make the desired movements during the programming step. In the non-limiting example of FIG. 1, the device ED comprises two keys extending on the lateral edges of the terminal 3, but in another possible embodiment the device can be located in the rear portion of the terminal, as described for instance in document EP-A-1 405 700.

The unit 2 and the terminal 3 are configured so as to communicate with each other in wireless mode, and to this purpose they are equipped with means for exchanging signals by air, comprising respective antennae 2a and 3d. Said means are sized so as to have a useful range of a few meters and therefore to be inside the field of action of terminal 3 with respect to the unit 2. Air transmission of signals can occur according to any known technique; in the preferred embodiment of the invention, wireless communication between unit 2 and terminal 3 takes place by radio-frequency, using the transmission system defined by standard IEEE 802.111 (which is wholly referred to for further details), known as Wi-fi system.

The wireless connection between the terminal 3 and the unit 2 basically enables the exchange of the three following types of information:

a) operating data, such as information concerning axis position, motion or jog instructions and in general all selections that can be made by means of the terminal 3, as well as software download from said terminal to the unit 2; also the unit 2 can send data to the terminal 3, such as information required for updating windows on the display 3a, indication codes (alarms, machine statuses, and so on), program upload, and so on;

b) status of the emergency stop device ES;

c) status of the enabling device ED.

The terminal 3 further comprises an electric connector 3e belonging to a recharging arrangement of an internal battery of said terminal, and a port for data transfer 3f, for example the connector of a serial communication port. In the disclosed non-limiting example, the connector 3e and the port 3f are positioned on the lower edge of the terminal 3. According to a first aspect of the invention, in order to allocate or couple univocally the terminal 3 and the control unit 2, the terminal should be first positioned near the control unit, or more generally in a predefined position. To this purpose, in the preferred embodiment of the invention, the unit 2 is provided with a positioning support 5 for the terminal 3, defined in the following as Docking Station; advantageously, the Docking Station 5 is configured so as to be used also for recharging an internal battery of the terminal 3.

The Docking Station 5 is preferably connected physically to the cabinet or stationary frame 2b of the unit 2, and for simplicity's sake, in the example it is configured as a sort of shelf defining a seat 5a open upwards; the lower portion of the terminal 3 can be inserted into the seat 5a in the direction of arrow F of FIG. 1. An electric connector 5b and a connector or port for data transfer 5c, which are complementary to connectors 3e and to port 3f, are fastened onto the bottom of said seat 5a. The insertion of the lower portion of the terminal 3 into the seat 5a results in the coupling or connection both between the connectors 3e and 5b and between the connectors or ports 3f and 5c.

The Docking Station is further equipped with a control element, such as a pushbutton 5d, used for starting a logic coupling-decoupling procedure between the terminal 3 and the unit 2, which is a further independent aspect of the present invention to be protected.

Still in FIG. 1, eventually, 2c refers to a signaling lamp indicating an inter-operating condition between the unit 2 and the terminal 3.

Figure 2:
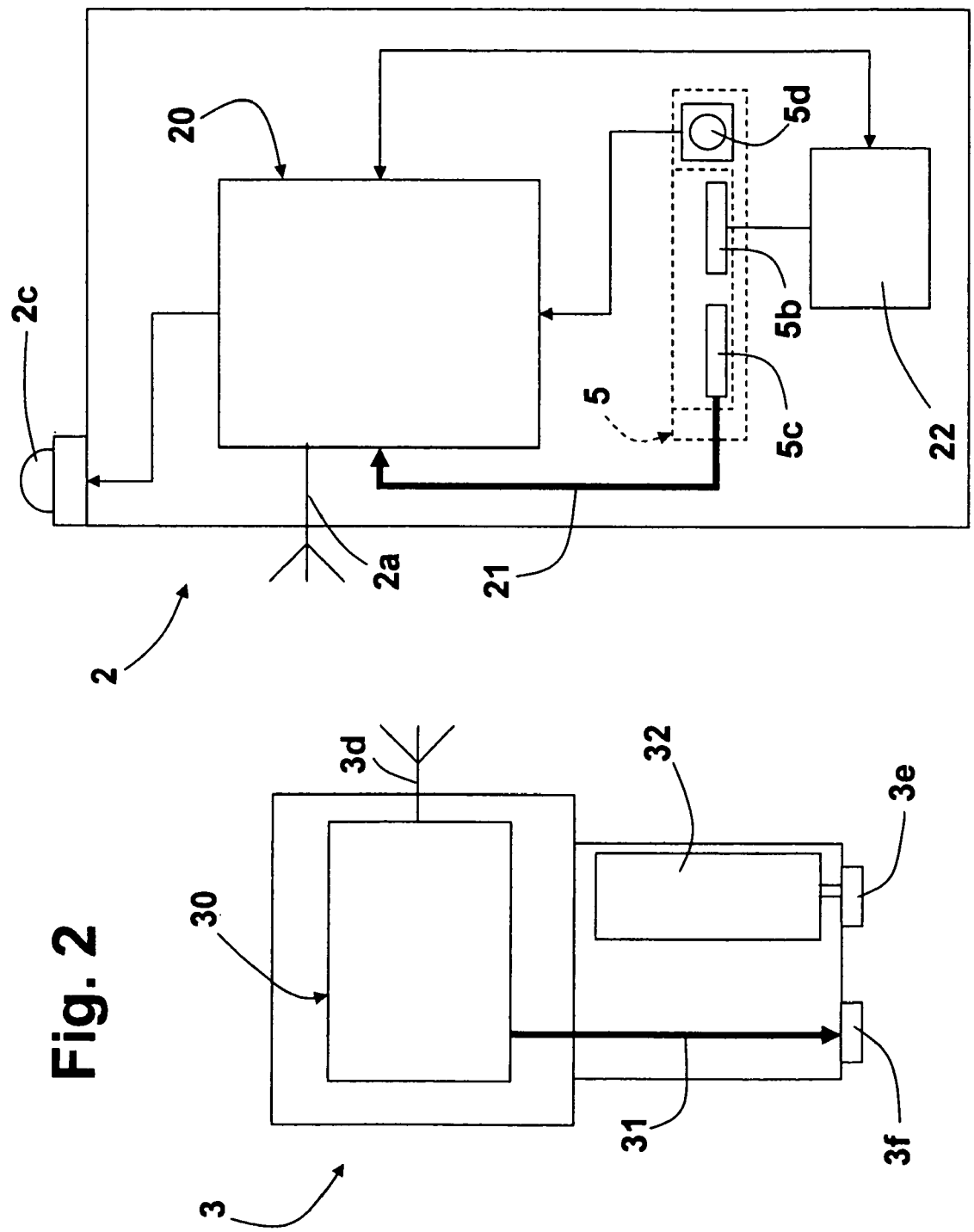
FIG. 2 shows a simplified block diagram of the control unit and of the terminal of the robot of FIG. 1.

In FIG. 2 the unit 2 and the terminal 3 are represented by means of simplified block diagrams.

The terminal 3 comprises a corresponding electronic control system, globally referred to with 30, for managing all the various functions of said terminal. The system 30 can send and receive data or information through the antenna 3d and it is further configured so as to enable data and information transfer through a further data communication line, here a physical or cable line, such as a serial unidirectional line, referred to with 31, connected to the port 3f. Number 32 refers to an autonomous supply source of the terminal, such as a rechargeable battery known per se, whose poles are connected to the contacts of the connector 3e.

The unit 2 comprises a corresponding electronic control system, globally referred to with 20, for managing all the various functions of said unit. The system 20 is configured so as to send and receive data or information through the antenna 2a; the system 20 is also configured so as to enable data and information transfer through a further data communication line, here a physical or cabled line, such as a serial unidirectional line, referred to with 21, connected to the port 5c of the Docking Station 5.

Number 22 refers to a recharging circuit, known per se, controlled by the system 20 and connected to the connector 5b of the Docking Station. The system 20 is further configured so as to control the operation of the lamp 2c, as well as to receive a control signal from the pushbutton 5d.

In order to enable the use of the terminal 3 for programming the robot, both the unit 2 and the terminal 3 are equipped with a corresponding univocal identifying code ID. Each ID code is preferably made up of two parts, represented by an IP network address (but it could be a MAC address) and by a series number SN. Thus:

$$ID\_CU = IP\_CU + SN\_CU$$

$$ID\_TP = IP\_TP + SN\_TP$$

where

ID_CU and ID_TP refer to the identifying codes of the unit 2 and of the terminal 3, respectively;

IP_CU and SN_CU refer to the IP address and to the univocal series number SN of the unit 2, respectively;

IP_TP and SN_TP refer to the IP address and to the univocal series number SN of the terminal 3, respectively.

For simplicity's sake and referring to the accompanying figures, let us suppose that IP_CU and IP_TP addresses are 4 and 2, that SN_CU and SN_TP series numbers are 4 and 5, and that, therefore, ID_CU and ID_TP identifying codes are 44 and 25, respectively.

IP addresses can be modified depending on the various needs, in ways that are not described here since they are known per se and do not fall within the scope of the present invention; to this purpose, IP addresses can be stored on rewritable permanent memories, such as Flash or EEPROM memories. Preferably, series numbers SN cannot be modified, and to this purpose they can be written by the manufacturer of the unit 2 and/or of the terminal 3 during manufacturing and/or test steps on permanent read-only memories, such as ROM memories. The identifying code ID is built by the control system of the unit 2 and of the terminal 3 after their switching on, and stored in a rewritable memory, for instance a RAM, Flash or EEPROM memory.

Figure 3:
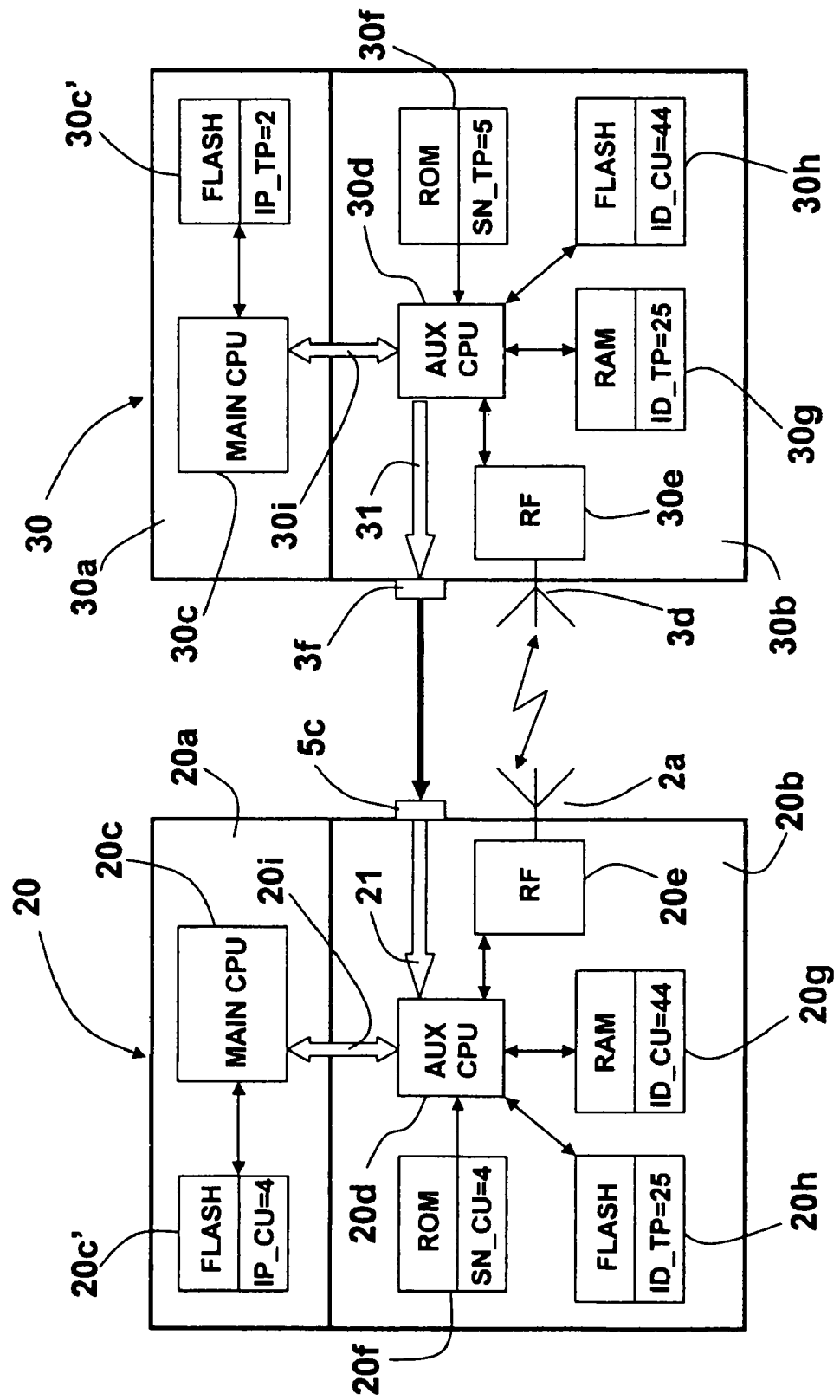
FIG. 3 shows a simplified block diagram of a part of the control systems of the unit and of the terminal of FIG. 2.

FIG. 3 shows with a block diagram the control systems 20 and 30 of the unit 2 and of the terminal 3, though only those parts thereof that are useful for understanding the aforesaid first aspect of the invention.

The control system 20 comprises a main module 20a and an auxiliary module 20b, the first one being designed to manage the typical functions of the unit 2 and the second one being designed specifically to manage data transfer with outside. The module 20a comprises a main processor 20c operatively associated to a Flash memory 20c', in which the HP_CU address of the unit 2 is coded; as was said, the processor 20c can modify the content of the memory 20c', if necessary. The module 20b comprises an auxiliary processor 20d for controlling a circuit 20e for wireless data exchange, including the antenna 2a; the processor 20d can also receive or read external data or information through the serial line 21, connected to the port 5c of the Docking Station 5 (see also FIG. 2). The processor 20d is operatively associated with a ROM memory 20f, a RAM memory 20g and a Flash memory 20h. The series number SN_CU of the unit 2 is coded permanently in the read-only memory 20f, whereas the temporary memory 20g is designed to retain the identifying code ID_CU of the unit 2; conversely, the rewritable memory 20h is designed to retain the identifying code ID_TP of the terminal 3. The main 20c and auxiliary processor 20d communicate with each other by means of a bus 20i of the unit 2, such as a CAN bus.

Also the control system 30 comprises a main module 30a and an auxiliary module 30b, the first one being designed to manage the typical functions of the terminal 3 and the second one being designed to manage data transfer with outside. The module 30a comprises a main processor 30c operatively associated to a Flash memory 30c', in which the IP_TP address of the terminal 3 is coded and can be modified if necessary. The module 30b comprises an auxiliary processor 30d for controlling a circuit 30e for data exchange by air, including the antenna 3d; the processor 30d can also send data or information or allow these to be read from outside through the serial line 21, connected to the port or connector 3f of the terminal 3 (see also FIG. 2). Here too, the processor 30d is operatively associated with a ROM memory 30f, a RAM memory 30g and a Flash memory 30h. The series number SN_TP of the terminal 3 is coded permanently in the read-only memory 30f, whereas the temporary memory 30g contains the identifying code ID_TP of the terminal 3; conversely, the rewritable memory 30h is designed to contain the identifying code ID_CU of the unit 2. The main 30c and auxiliary processor 30d communicate with each other by means of a bi-directional serial line 30i.

As was already mentioned, when switching on the unit 2, the control system 20 builds the code ID_CU by means of the two processors 20c, 20d and of the memories 20c', 20f, which code is stored in the memory 20g until said unit is switched off; analogously, when switching on the terminal 3, the control system 30 builds the code ID_TP by means of the two processors 30c, 30d and of the memories 30c', 30f, said code being stored in the memory 30g until said terminal is switched off. The memories 20g and 30g could, if necessary, be replaced by rewritable permanent memories, such as Flash or EEPROM memories, for containing ID codes also after the devices 2, 3 are switched off.

According to the first relevant aspect of the solution described here, the univocal connection between the terminal 3 and the unit 2—which is required to enable the use of said terminal for programming the robot—is implemented by means of a suitable procedure; in the embodiment described here, said procedure, in the following also defined as "logic coupling" procedure, presupposes that the terminal 3 is positioned on the Docking Station 5 of the unit 2; the coupling of the terminal with a given control unit therefore requires a physical closeness of the two devices.

FIGS. 4-7 show schematically a possible logic coupling procedure between the unit 2 and the terminal 3.

Figure 4:
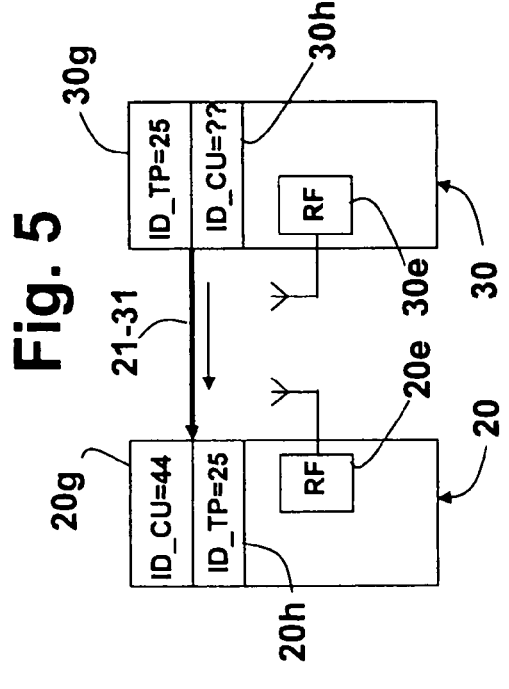
FIGS. 4-7 are schematic representations of the steps of a logic coupling procedure between the control unit and the terminal of FIG. 3.

FIG. 4 shows the situation in which the switched-on terminal 3 is placed on the Docking Station 5. Under such circumstances, as was explained, a "physical" connection is established between the control systems 20, 30 of the unit 3 and of the terminal 3 by means of the connectors or ports 3f and 5c. By pressing the pushbutton 5d of the Docking Station 5 an operator starts the coupling procedure; in the initial step of said procedure the control system 20 checks by means of suitable sensor means the actual presence of the terminal 3 on the Docking Station 5 (this can be obtained by using for instance a current sensor belonging to the recharging circuit 22 of FIG. 3).

Figure 5:
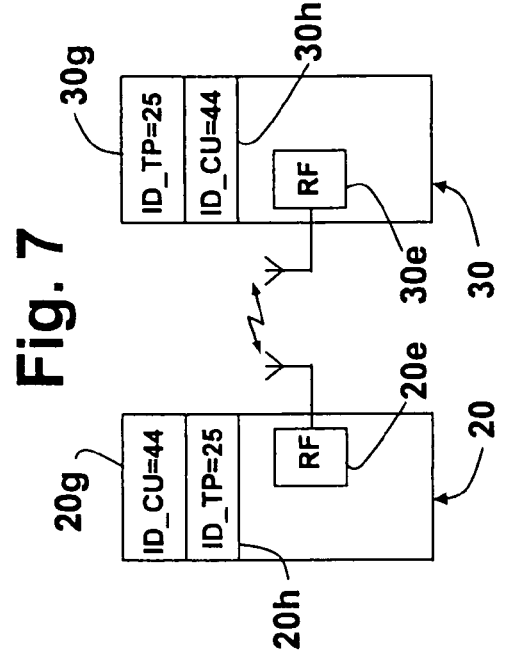

FIG. 5 shows the following step in which, after the confirmation of the presence of the terminal 3, the control system 20 reads the content of the memory 30g of the control system 30, i.e. the identifying code ID_TP of the terminal 3; this is carried out (see also FIG. 3) by means of the auxiliary processors 20d and 30d, connected through the serial lines 21, 31 and the ports 3f, 5c. The result of said reading is then stored by the processor 20d in a predefined register of the memory 20h, if said register is free, or compared with the content thereof, if already occupied (such a register can be the one referred to with R0 in FIG. 13). The fact that the aforesaid register of the memory 20h is free means that the terminal 3 is not coupled at present with any unit 2, whereas the condition in which the memory register 20h is already occupied means that the terminal 3 is already coupled with a control unit. In practice, the three following situations can occur:

a) if the aforesaid register of the memory 20h is free, the operator is correctly trying to establish a logic coupling procedure between the unit 2 on whose Docking Station 5 the terminal is now positioned;

b) if the ID_TP code read is the same as the one stored in the aforesaid register of the memory 20h, the operator is correctly trying to establish a logic decoupling procedure, as will be described in further detail below;

c) if the ID_TP code read differs from the one stored in the aforesaid register of the memory 20h, the operator is incorrectly trying to establish a coupling procedure with a terminal already coupled with another unit, or s/he is incorrectly trying to establish a decoupling procedure on the Docking Station of a control unit differing from the one with which the terminal is currently coupled (which is not allowed, as will be discussed below).

Figure 6:
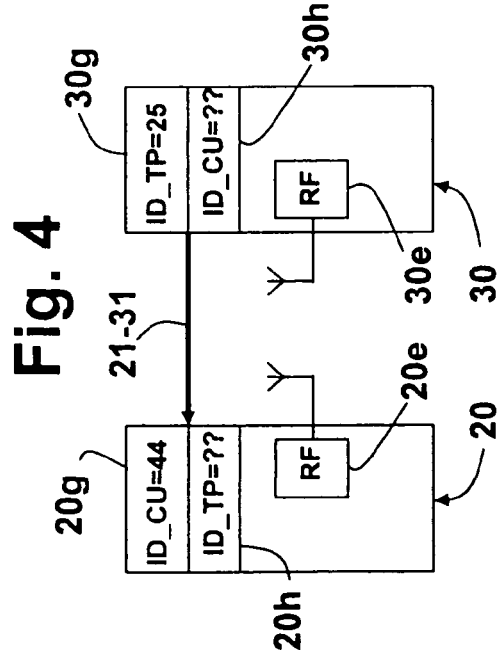

In case c) the unit 2 emits a suitable error signal; in case-cases a) and b), conversely, the coupling or decoupling procedure respectively, can go on to the next step, shown in FIG. 6.

During said step, after memorizing the ID_TP code the control system 20 of the unit 2 communicates its own identifying code ID_CU to the control system 30 of the terminal 3, which in the meanwhile switches to a waiting status. To this purpose (see also FIG. 3) the processor 20d reads the content of the memory 20g and transmits the related information in wireless mode together with a coupling instruction by means of the circuit 20e (said transmission can occur thanks to the fact that the system 20 now knows the "identity" of the terminal 3); on the other hand, the coupling instruction with the ID_CU address is received by means of the circuit 30e by the processor 30d, which then stores the related information in a predefined register of the memory 30h, which is free at present. Preferably, said procedure ends with a wireless exchange between the unit 2 and the terminal 3 of information confirming that the logic coupling has occurred.

Figure 7:
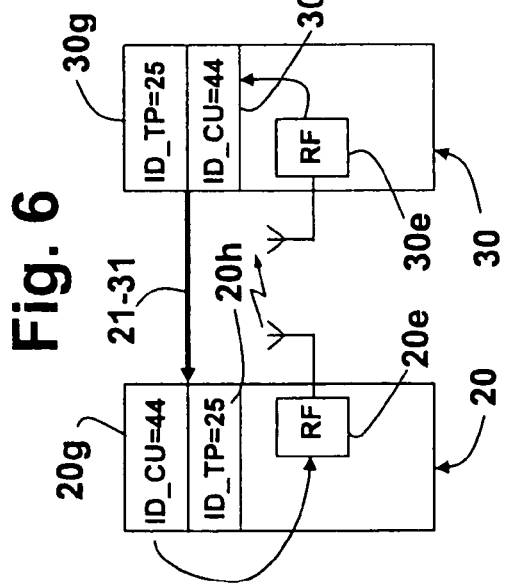

Now, as shown by way of example in FIG. 7, the unit 2 and the terminal 3 are coupled with each other, i.e. each of them knows the identifying code ID of the other one, and are therefore enabled to operate in the robot programming mode, in which the terminal 3 can transmit in wireless mode the instructions of motion of the manipulator 1 as well as the required status information concerning the safety devices (i.e. emergency stop device ES and enabling device ED).

As can be inferred, in case of systems comprising several robots, the units in which the aforesaid register of the memory 20g is free will not be enabled to allow manual motion of the respective manipulators.

The result of the coupling procedure can be made explicit in any way, for instance by means of a visual indication with a suitable lamp or with a display of the unit 2 and/or of the terminal 3.

In the system described here, ID codes are univocal addresses required for information exchange between the unit 2 and the terminal 3, or better absolutely necessary for enabling the use of the terminal for programming or teaching the robot. Therefore, in the preferred case of data packet transmission from the terminal 3 to the unit 2 during robot programming, the header of a transmitted packet will contain the ID_CU code, whereas the information content of said packet (payload) will concern the transmitted information (about for instance an instruction of motion of the manipulator 1, status information of the emergency stop device, status information of the enabling device). In other words, therefore, any programming and/or motion information, in order to be identified and executed by the unit 2, should be contained in a data packet identified by the ID_CU code.

On the other hand, in case of transmission from the unit 2 to the terminal 3, the header of a transmitted packet can contain the ID_TP code (but it could also be the address IP_TP), and the information content of said packet will concern the transmitted information (such as an alarm or a machine status, data for updating a window on the display 3, and so on).

Wireless channels are continuously tested—in a way known per se—through polling procedures on unit 2 and terminal 3 sides with a rate varying depending on the activity of the processor managing communication.

When the terminal 3 should be used together with a "new" unit 2 (i.e. a unit differing from the one with which the terminal is coupled at present), a decoupling procedure should be executed, as was already mentioned above. In the preferred embodiment of the invention, said procedure should be carried out on the Docking Station 5 of the unit 2 with which the terminal 3 is already coupled; once said decoupling procedure is over, the terminal 3 can be inserted onto the Docking Station 5 of the other unit 2, so as to execute efficiently the corresponding logic coupling procedure.

FIGS. 8-11 show schematically a possible logic decoupling procedure between the unit 2 and the terminal 3.

FIG. 8 shows the situation in which the terminal 3, switched on, is on the Docking Station 5, i.e. in a condition as the one of FIG. 4. The decoupling procedure is started by pressing the pushbutton Sd of the Docking Station 5; here again, in the initial step of the procedure, the actual presence of the terminal 3 on the Docking Station 5 is checked, as was already described above.

FIG. 9 shows the following step in which, after receiving the confirmation of the presence of the terminal 3, the control system 20 reads the content of the memory 30g of the control system 30, i.e. the identifying code ID_TP of the terminal 3, basically as was already described above, through a serial connection. The data resulting from the aforesaid reading is compared by the processor 20d with the content of the aforesaid predefined register of the memory 20h. If the read ID_TP code differs from the one contained in said register, the decoupling procedure is interrupted and a suitable indication is emitted, for instance a visual or acoustic indication, for the operator; the lack of identity between the codes clearly means that the operator is trying to carry out the procedure on a unit 2 other than the one currently allotted to the terminal 3. Conversely, in case of correspondence between the two data (read ID_TP and stored ID_TP), the procedure goes on, as shown in FIG. 10.

During this step the processor 20d sends to the control system 30 of the terminal 3—which in the meanwhile has switched to a waiting status—a decoupling instruction or an instruction of deletion of the content of the memory 30h (see also FIG. 3). Said instruction is transmitted by the processor 20d in wireless mode by means of the circuit 20e; the information concerning the instruction is received by means of the circuit 30e by the processor 30d, which after sending a suitable confirmation to the unit 2 in wireless mode deletes the memory 30h. Upon reception of said confirmation, the processor 20d of the control system 20 of the unit 2 deletes the content of its memory 20h.

Now the unit 2 and the terminal 3 are decoupled, i.e. the contents of the memories 20h and 30h of their control systems 20, 30 are free, as shown by way of example in FIG. 11; under these circumstances, the terminal 3 is no longer enabled to send the unit 2 instructions of motion of the corresponding manipulator 1. Here again, the result of the procedure can be made explicit in any way.

The unit 2 and the terminal 3 are obviously equipped with respective software programs for executing the procedures described with reference to FIGS. 4-7 and 8-11, said programs being implemented with any technique and known language.

As was explained in the introduction of the present description, a cell can comprise both a manipulator and several manipulators, each being equipped with its control unit 2. In case of a system comprising several robots, the terminal 3 described above can be used either in a "point-to-point" mode or in a "multipoint" mode.

In the first case the terminal 3 can communicate only with the control unit 2 associated with it. In this configuration of use the terminal 3 is provided with the full data transmission/reception and programming functions; the operator can thus enter the protected operating area of the manipulator for "teaching" the robot, under these circumstances the safety devices between the terminal 3 and the control unit (emergency stop device ES and enabling device ED) being active. The allocation and connection between the terminal 3 and the corresponding unit 2 takes place by means of the dedicated coupling procedure described above, by positioning said terminal on the Docking Station 5 of the concerned unit 2. Under these circumstances, an evident visual indication enables the operator using the terminal 3 to identify the active connection, i.e. the unit 2 which the terminal is currently coupled with. To this purpose a suitable indication can be provided on the display 3a of the terminal 3, on which the "name" of the connected control unit 2 will be displayed; means for signaling the connection are also provided on the control unit 2, in this example the lamp 2c, which will be on continuously for indicating the active connection with the terminal 3. The lamp 2c will have such size, color and position as to be well visible (for instance amber color and placed on top of the unit 2 or on its control panel or on the Docking Station 5). Note that as an alternative or in addition to the case just described, a lamp 2c can also be mounted onto the manipulator 1 or near the latter.

In case of "multipoint" mode in accordance with a second independent aspect of the invention to be protected, the terminal 3 can be simultaneously connected with at least two control units 2 in different modes, and in particular with a so-called "main" or exclusive connection and with at least one so-called "secondary" connection. Such a case is shown schematically by way of example in FIG. 12, where a generic cell C contains four different robots, referred to with X, Y, W and Z, each having a manipulator 1x, 1y, 1w, 1z with its control unit 2x, 2y, 2w, 2z equipped with its Docking Station 5x, 5y, 5w, 5z and its lamp 2cx, 2cy, 2cw, 2cz. As is evident, the cell is gone through by an advance line L on which two operating stations are present, one being made up of the robots X and Y and the other one of the robots W and Z, the robots of each pair being arranged in a basically symmetrical position with respect to both sides of the line L.

In the example, the robot X basically corresponds to the robot of FIG. 1, whose unit 2x is characterized by the codes IP=4 and SN=4 (and therefore with a code ID_CU=44) as in the example described above; conversely, the codes of the other robots are the following: unit 2y: IP=5, SN=8; unit 2w: IP=6, SN=7; unit 2z: IP=7, SN=2.

In the situation shown above, the terminal 3 has a main connection with the robot X and a secondary connection with the robot W. The status of main connection with the robot X—referred to in the figure by the arrow "Main"—basically corresponds to the "point-to-point" mode described above, so that a complete connection is established between the terminal 3 and the unit 2x, safety devices being active and being thus possible to control manually the manipulator 1x to programming purposes.

The status of secondary connection with the robot W—represented in the figure by the arrow "Secondary"—enables to use the same terminal 3 also for monitoring or re-mote data exchange functions with respect to the unit 2w (machine status check, current pro-gram steps, alarms if present, data download between terminal and control unit and/or vice versa, update of display windows, and so on), though without the possibility of programming or controlling the motion of the corresponding manipulator 1w: this is due to the fact that, in the secondary connection emergency channels (i.e. those related to the statuses of the safety device ES and enabling device ED) are not active, said channels being active only in the main connection towards the unit 2x.

The allocation and connection between the terminal 3 and the unit 2x for the main connection should always take place by means of the dedicated procedure described above, by using the Docking Station 5x of the unit 2x. Conversely, the allocation and connection between the terminal 3 and the unit 2w (and the subsequent deactivation of the connection) takes place by means of a software procedure that does not require the terminal to be positioned on the Docking Station 5w.

The indication of the main connection to the operator belongs to the case of "point-to-point" connection and can therefore be implemented by means of the display 3a of the terminal 3 and the lamp 2cx of the unit 2x, which is steadily on. As far as indications of the secondary connection are concerned, on one hand the display 3a of the terminal 3 will show a suitable additional window with the "name" of the unit 2w having a secondary connection; on the other hand, on the unit 2w the lamp 2cw will be blinking, thus indicating the status of secondary connection with the terminal 3.

FIG. 13 shows a possible way to implement the "multipoint" connecting function as described above with reference to FIG. 12; in said FIG. 13 only some components of the control system 30 of the terminal 3 are shown, already described with reference to FIG. 3; conversely, the control units 2x, 2y, 2w and 2z of FIG. 12 are shown schematically, with the indication of their IP addresses and series numbers SN.

As shown by way of example in FIG. 13, the rewritable memory 30h of the control system 30 of the terminal 3 comprises a plurality of registers, some of which being referred to with R0, R1, R2, R3, R4; one of said registers, in the case shown by way of example the one referred to with R0, is specifically designed to store the identifying code ID_CU of the control unit which the terminal 3 is coupled with for the main connection or to programming purposes; said storage occurs—as was explained—thanks to the special procedure described with reference to FIGS. 3 and 4-7.

The other registers R1, R2, R3 and R4, conversely, are designed to contain respective addresses of secondary connection of the units 2x, 2y, 2w and 2z; in the example shown said addresses consist of the IP addresses of the aforesaid units.

In a possible embodiment, IP addresses of the units 2x, 2y, 2w and 2z can be pre-stored in the registers R1-R4, for instance upon installation of the cell C with its robots; in such a case, therefore, the IP addresses of the units which the terminal 3 is meant to be able to establish a secondary connection 3 with are inserted into the terminal 3 designed to be used together with a given cell (but it could also be with a plurality of cells, placed for instance on the same manufacturing line). The storage of said addresses can be carried out through a simple software procedure directly on the terminal 3, using its display 3a and its keys 3c, and it is not necessarily a permanent storage; as was mentioned, it may happen that the IP address of each control unit (contained in the corresponding memory 20c of FIG. 3) must be modified in time, for instance as a result of changes made in time to the cell C; as a consequence, also the content of the registers R1-R4 of the memory 30h of FIG. 13 can be modified when necessary.

As an alternative, the allocation of the secondary connection between the terminal 3 and at least one unit 2x, 2y, 2w and 2z can occur through a radio communication channel, with a variable and dynamic occupation of the registers R1-R4 of the memory 30h.

In a first possible embodiment of this type, the units 2x-2z making up the cell C are programmed so as to declare periodically their IP address in wireless mode; in other words, therefore, the control systems of said units emit at regular intervals by means of their respective circuit 20f (see FIG. 3 and its description) a signal containing the IP address information. On the other hand, the control system 30 of the terminal 3 is configured so as to switch periodically to a waiting status for receiving said signals; the terminal 3 and the units 2x-2z can be suitably programmed so that the interval with which said terminal switches to a waiting status is a multiple of the interval with which the units emit their address signals.

After the respective circuit 30e has received the aforesaid signals, the control system 30 of the terminal 3 stores the various IP addresses thus received in the registers R1-R . . . in sequential order. Obviously, the auxiliary processor 30d compares the IP addresses periodically received with those that might already be stored in the addresses R1-R . . . , so as to avoid a double storage of the same information.

In accordance with another possible embodiment, the terminal 3 can conversely be configured so as to "summon" for the secondary connection the units 2x-2z that might be available in the network. In said situation, therefore, automatically or as a result of a specific instruction entered by the operator on the terminal 3, the control system 30 of the latter emits cyclically for a given lapse of time and by means of the circuit 30e a query signal, i.e. an invitation to the resources available in the network to "introduce themselves", and then switches to a response waiting status; after receiving said query signal through the respective circuits 20e, the control units available in the network transmit through said circuits 20e their IP address signals, which the terminal 3 receives and then stores in the registers R1-R4, basically in the same way as described above. Obviously, in this embodiment the control systems of the units 2x-2z will cyclically switch to a waiting status for receiving the aforesaid query signal; the terminal 3 and the units 2x-2z can be programmed, if necessary, so that the interval with which said units switch to a waiting status is a sub-multiple of the lapse of time during which the terminal emits cyclically the query signal; on the other hand, the response waiting time for the terminal 3—after the emission of a query signal—can be a multiple of the interval imposed to the units for emitting their address signals.

The system can be conceived so that at least one secondary connection can be enabled only if the terminal 3 already has a main connection, i.e. it is logically coupled with one of the control units; the system can further be configured so that the control unit that already has a main connection with the terminal 3 (in the example of FIG. 13 unit 2x) does not communicate its IP address for the storage in one of the registers R1-R . . . of the memory 30h, since it is unnecessary.

If required, the control systems 2x-2z can be configured so as to communicate to the terminal 3, beside their IP address, also further identifying information enabling the operator a visual identification of the various units, whatever the status of the lamps 2cx-2cz, i.e. also before the secondary connection is established. For instance, referring to the example of FIG. 12-13, the various units 2x-2z and/or their manipulators 1x-1z can be equipped in a well visible position with a plate indicating a robot name in alphabetical, numeric or alphanumeric characters; with reference to the example of FIGS. 12-13, said name can be made up of the series number SN, and therefore "4", "8", "7" and "2" for robots X, Y, W and Z, respectively. By sending the aforesaid additional identifying information and by storing the latter in a suitable memory thanks to the control system 30, the terminal 3 can associate each IP address also with a "label" of the corresponding robot, so as to show it on the display 3a. Thus, a selection window can be activated on the display 3a, so as to display the list of labels of the units which can establish a secondary connection with the terminal 3; after visual identification in the cell C (through the corresponding plate) of the robot with which the secondary connection should be established, the operator can select the corresponding label by means of the aforesaid window and thanks to the keyboard of the terminal 3. As a result of said selection, the status of "Secondary" connection will be shown on the control unit 2w (in the example of FIG. 12-13) by blinking of the corresponding lamp 2cw; the display 3a of the terminal 3, conversely, will show a dialog window containing, beside the label of the robot W, the various options allowed by the secondary connection; as was said, said options refer basically to the possible remote monitoring of the unit 2w and to the exchange of data and information differing from programming/motion data and information of the manipulator 1w, which are not allowed by the secondary connection.

At any time, the operator using the terminal 3 can activate a different secondary connection by simply recalling on the display 3a the aforesaid display window and choosing from the corresponding list the label of another robot; said possibility is shown by way of example by the hatched arrows of FIG. 13.

As was mentioned before, also the status of "Main" connection with the unit 2x is shown on the terminal 3 through a suitable dialog window on the display 3a, containing, beside the name of the robot X, the various options allowed in said type of connection; on the unit 2x the "Main" connection will be shown by the lamp 2cx being continuously on.

Obviously, the software which the terminal 3 is equipped with is provided with suitable menus or functions for selecting the windows to be shown on the display 3a, and it is therefore possible to switch between the connection windows "Main" and "Secondary".

From the previous description it can be inferred that, according to the first aspect of the invention as described, in order to enable a robot for programming/motion functions, the portable terminal 3 should be placed in a given position with respect to the control unit 2, so as to start a suitable logic coupling procedure. Preferably, said coupling can be obtained only as a result of the physical approach between said two devices, and in particular after placing the terminal 3 in a suitable support 5 belonging to the unit 2; thus, the operator that should use the terminal 3 is indeed forced to pre-identify visually which one of the robots present in the working area C can be moved manually. The use to programming purposes of a terminal 3 together with a unit 2 differing from the one which said terminal is coupled with then presupposes a specific decoupling procedure; as was discussed, said procedure should anyhow be carried out in the unit 2 which the terminal 3 was already coupled with. The need to execute manually coupling and decoupling operations increases the operator's awareness, thus reducing possible confusions and resulting risks.

The fact that, in a preferred though not exclusive embodiment, the exchange of the ID codes between the terminal 3 and the unit 2 takes place using two different communication lines (serial connection and wireless connection) increases intrinsically the safety of the coupling operation; the fact that the coupling procedure can end only after a correct radio feedback between the unit 2 and the terminal 3 allows to get a confirmation on the correctness and operativeness of the wireless connection, before the terminal is actually used for programming the predefined robot.

The proposed solution does not make the implementation of the terminal 3 particularly difficult, since it involves at most only the addition of some internal electronic components (if they are not already present) and of an auxiliary communication line for transferring the identifying code ID_TP (moreover, in case of use of power line communication—as explained below—the port 3f and the serial line 31 can be omitted); the absence of a dedicated seat for a removable module, as provided for in WO 02/078913, simplifies the layout of the terminal, which can thus be compact and light.

On the other hand, the unit 2 is equipped with a support or seat with some elementary and/or standard contacts, in which the terminal should be placed. A wireless terminal necessarily includes a battery, preferably a rechargeable battery; advantageously, therefore, means that should in any case be present so as to recharge the terminal battery can be exploited, in the preferred embodiment of the invention, for integrating also part of the means enabling to couple logically the terminal and the control unit with one another.

The possibility of a "multipoint" connection according to the second aspect of the invention is on the other hand extremely advantageous as far as the practical use of the terminal is concerned.

As was mentioned in the introduction to the present description, a robot can operate in an automatic operation mode. In said mode and with reference to the example of FIG. 12, the robots X-Z execute their operating programs inside the cell C, which the personnel cannot enter but is under the visual control of an operator. Under these circumstances, the portable terminal 3 can be placed—as occurs typically—in a stationary position near the cell C, though the emergency stop pushbutton ES being active, by means of which the operator can stop the robot X and/or—as provided in many cases—the whole cell C, if necessary.

As was explained, according to the first aspect of the invention, the function associated with the pushbutton ES is active only in case of a "Main" connection between a robot and the terminal 3, the latter being allowed, according to the second aspect of the invention, to establish selectively at least also one "Secondary" connection. As can be inferred, thanks to the aforesaid possibility, the operator monitoring the cell C can monitor remotely the control systems of the various robots X-Y by means of the terminal 3 and therefore from only one place, without having to move continuously near each of the units 2x-2z for checking their machine statuses on their control panels.

The "multipoint" connection mode further enables to simplify the programming activity of systems in which several robots execute basically similar operations.

Figure 12:
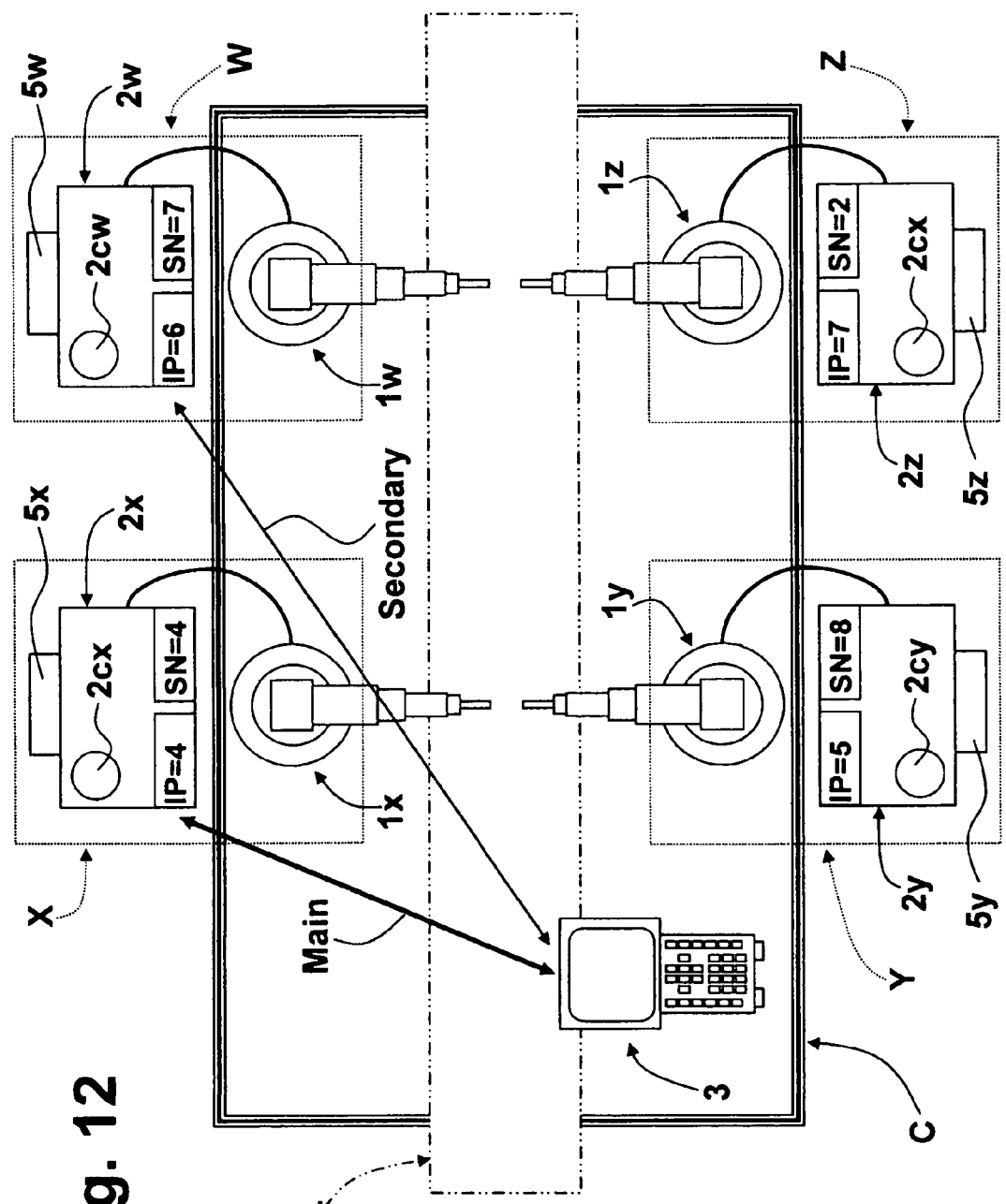
FIG. 12 is a schematic representation of a working cell comprising a robot system as described here.

For instance, as in the case shown by way of example in FIG. 12, a cell C often contains several working stations on the same line L, each station having two robots in opposite positions; in the case shown two stations are present, including robots X-Y and W-Z, respectively. For various manufacturing types, moreover, the two robots of the same station execute automatically identical operations on opposite portions of the same part on the line L, the basic movements of one robot being therefore perfectly symmetrical or inverse with respect to those executed by the other robot. In other words, therefore, the operating program of the first robot differs from the one of the second robot only for a given series of parameters (such as position coordinates of the joints of the manipulator or the direction of movement of its parts, within a given space reference system).

Under these circumstances, after programming the first robot of a station—which is supposed to be here the robot X of FIG. 12—an operator can establish through the terminal 3 a "Main" connection with the second robot of the same station—the robot Y in the example—so as to program the latter. In said condition of main connection with the robot Y, the operator can anyhow establish a "Secondary" connection with the unit 2x, which has already been programmed, so as to download onto the terminal 3 the corresponding operating program; once said program has been obtained, the operator can go back to the programming mode allowed by the "Main" connection, so as to modify the aforesaid parameters of the program previously downloaded and thus adapt it to the robot Y.

Obviously, a man skilled in art can implement several variants of the industrial robot and of the robot system described by way of example, although without leaving the novelty framework of the inventive concept.

Logic coupling and decoupling procedures could be started, instead with the key 5d, by means of an instruction given by the terminal 3, provided the latter has been previously positioned on the Docking Station 5 of the concerned unit 2. In this case, after starting the procedure, the control system 30 of the terminal can communicate its own code ID_TP to the control system 20 of the unit 2 by means of the serial connection made up of the components previously referred to with 31, 3f, 3c and 21 (if necessary, the terminal 3 could read the code ID_CU of the system 20, and the coupling/decoupling procedure could take place inversely with respect to the one described previously, managed by the system 30).

In possible differing embodiments, the connection due to the positioning of the terminal 3 near the unit 2 can be obtained with different means with respect to a cabled serial line, and in particular with a connection without physical or dedicated contacts. For instance, the information concerning at least one ID code could be transferred using RFID technology, with at least one tag associated with the terminal 3 and at least one corresponding tag reader associated with the unit 2 and/or with its manipulator 1; in said application, the components of the RFID system are preferably sized so as to have a useful range of few centimeters, so that the information can be transferred only when the terminal 3 is positioned on the Docking Station 5 or close to the unit 2 and/or to the manipulator 1. Another possibility involves the use of an infrared interface, i.e. with an optical connection established between the unit 2 and the terminal 3 only when the latter is inserted into the Docking Station 5 or in a predefined position with respect to the unit 2 and/or to the manipulator 1. Still another possibility is to implement a serial line by power line communication, the information transfer therefore occurring by exploiting the same electrical connection line establishing between the recharging circuit 22 and the battery 32 of the terminal 3, when the latter is positioned on the Docking Station 5.

Still aiming at increasing the operators' awareness, the Docking Station 5 or the means replacing it for the coupling/decoupling procedure (such as the aforesaid RFID or infrared system) could be placed near the manipulator 1.

What is claimed is:

1. A method for controlling and selectively programming a plurality of manipulators of industrial robots through a portable control and programming terminal having one safety device, each manipulator having a control unit, the method comprising:

implementing a first wireless communication channel directly between said terminal and the control unit of one of the manipulators of said plurality, providing a further communication channel between said terminal and the control unit of at least another one of the manipulators of said plurality, the method further comprising:

implementing said further communication channel through a second wireless channel directly between said terminal and the control unit of said at least another one of the manipulators of said plurality;

configuring said terminal and the control units of the manipulators of said plurality such that, in view of a session of use of said terminal, a first wireless connection mode can be selectively enabled between said terminal and any one of the control unit of the manipulators of said plurality, or first manipulator; and a second wireless connection mode can be selectively enabled between said terminal and the control unit of at least another one of the manipulators of said plurality, or second manipulator;

and wherein, during said session of use, said first wireless connection mode allows said terminal to send only to the control unit of said first manipulator, via said first wireless communication channel, information or signals concerning instructions of motion and status conditions of said safety device;

said second wireless connection mode allows exchange between said terminal and the control unit of said second manipulator, via said second wireless channel, of monitoring and control information, except for information or signals concerning at least one of instructions of motion and status conditions of said safety device.

2. The method according to claim 1, wherein said second wireless channel can be activated selectively in the second wireless connection mode directly towards the control unit of each one of the manipulators of said plurality other than said first manipulator.

3. The method according to claim 1, wherein the first wireless connection mode and the second wireless connection mode are at least one of enabled and disabled through different procedures.

4. The method according to claim 3, wherein the first connection mode is enabled through a logic coupling procedure involving positioning of said terminal in a substantially predefined position; and once said logic coupling procedures has ended, said terminal is removed from said substantially predefined position, for allowing use of the terminal during said session of use.

5. The method according to claim 4, wherein, with said terminal being in said substantially predefined position, an auxiliary connection is established between said terminal and the control unit of said first manipulator, which is required for executing said logic coupling procedure, and wherein said auxiliary connection is interrupted after said first connection mode has been enabled through said logic coupling procedure, to allow use of said terminal in the frame of said session of use.

6. The method according to claim 4, wherein said logic coupling procedure comprises at least the following operations:

making available to the control unit of said first manipulator identity information of said terminal, through an auxiliary connection;

making available to said terminal identity information of the control unit of said first manipulator, preferably through a wireless communication;

interrupting said auxiliary connection after said logic coupling procedure has ended, to allow use of said terminal in the frame of said session of use.

7. The method according to claim 3, wherein the second connection mode is at least one of enabled and disabled through a software procedure in said terminal.

8. The method according to claim 7, wherein said software procedure comprises at least one of the following operations:

said terminal communicates in wireless mode respective identity information to the control unit of said second manipulator, the control unit of said second manipulator communicates in wireless mode respective identity information to said terminal.

9. The method according to claim 8, comprising storing in a memory of said terminal identity information of several manipulators of said plurality for the subsequent use thereof within said software procedure.

10. The method according to claim 8, wherein said terminal acquires through a wireless connection identity information of several manipulators of said plurality and stores said identity information of several manipulators in a memory.

11. The method according to claim 1, wherein the following operations are provided:

implementing, on said terminal and on said first manipulator, a first visual indication of an enabled condition of said first wireless connection mode, for signaling a user of said terminal which manipulator of said plurality is currently connected to said terminal via said first wireless communication channel;

implementing, on said terminal and on said second manipulator, a second visual indication of an enabled condition of said second wireless connection mode, for signaling a user of said terminal which manipulator of said plurality is currently connected to said terminal via said further wireless communication channel.

12. The method according to claim 11, wherein said first and second visual indications are obtained through a display of the terminal and through a lamp device of the manipulators.

13. A system of industrial robots comprising a plurality of manipulators and one portable control and programming terminal, which implements the method according to claim 1.

14. A computer program product comprising computer instructions or code portions, which can be uploaded into a memory and executed by a processor for controlling an industrial robot in accordance with the method according to claim 1.

15. A system of industrial robots comprising a plurality of manipulators and a portable control and programming terminal which has at least one safety device and is configured so as to allow to control and selectively program the manipulators of said plurality through communication channels, each manipulator comprising a control unit, the system further comprising:

a first wireless communication channel directly between said terminal and the control unit of one of the manipulators of said plurality; and a further communication channel between said terminal and the control unit of at least another one of the manipulators of said plurality;

wherein said further communication channel is implemented through a second wireless channel directly between said terminal and the control unit of said at least another one of the manipulators of said plurality;

said terminal and the control units of the manipulators of said plurality comprise respective controllers configured so as to allow, in view of a session of use of said terminal, to:

selectively activate a first wireless connection mode between said terminal and the control unit of any of the manipulators of said plurality, or first manipulator, and activate a second wireless connection mode between said terminal and the control unit of at least another one of the manipulators of said plurality, or second manipulator, such that, during said session of use, said first wireless connection mode allows said terminal to send only to the control unit of said first manipulator, via said first wireless channel, information or signals concerning at least one of instructions of motion and status conditions of said safety device;

said second wireless connection mode allows exchange between said terminal and the control unit of said second manipulator, via said second wireless channel, of monitoring and control information or signals, except for information concerning at least one of instructions of motion and status conditions of said safety device.

16. The system according to claim 15, wherein said terminal comprises selection means for enabling a selective activation of said further communication channel in said second wireless connection mode towards the control unit of each one of the manipulators of said plurality other than said first manipulator.

17. The system according to claim 15, wherein first controllers are provided for enabling said first wireless connection mode, and second controllers are provided for enabling said second wireless connection mode.

18. The system according to claim 17, wherein said terminal and the control units of the manipulators of said plurality comprise respective first means for communicating designed to implement said first and second wireless communication modes, and the first controllers comprise second means for communicating designed to establish a temporary an auxiliary connection between the control unit of said first manipulator and said terminal when said terminal is in a substantially predefined position and close to said first manipulator, wherein said first controllers are configured so as to use said auxiliary connection only for executing a logic coupling procedure between the control unit of said first manipulator and said terminal to enable said first wireless communication mode, and to interrupt said auxiliary connection once said coupling step has ended by a removal of the terminal from said substantially predefined position once said logic coupling procedures has ended, for allowing use of the terminal during said session of use.

19. The system according to claim 18, wherein said terminal is configured so as to acquire in wireless mode identity information transmitted by several control units of the manipulators of said plurality and then store said identity information of said several control units in a memory.

20. The system according to claim 17, wherein said terminal comprises storage means for retaining identity information of several manipulators of said plurality.

21. The system according to claim 18, wherein the terminal comprises a rechargeable battery having a first connector, the manipulator comprises a recharging arrangement having a second connector engageable with the first connector, said first and second connectors being configured be operatively coupled when the terminal is in said substantially predefined position.

22. The system according to claim 17, wherein said second controllers comprise means for controlling from said terminal enabling of said second wireless connection mode.

23. The system according to claim 18, wherein the manipulators of said plurality comprise respective means for defining or identifying the substantially predefined position at which the terminal has to be placed for establishing said auxiliary connection.

24. The system according to claim 15, wherein said terminal and the control units of the manipulators of said plurality comprise a respective visual indicator configured so as to signal a condition of activation of at least one of said first wireless connection mode and said second wireless connection mode.

* * * * *